United States Patent
Sato

(10) Patent No.: US 7,454,134 B2
(45) Date of Patent: Nov. 18, 2008

(54) IMAGE SIGNAL PROCESSING UNIT AND DIGITAL CAMERA

(75) Inventor: Koichi Sato, Saitama (JP)

(73) Assignee: Hoya Corporation, Tokyo (JP)

( * ) Notice: Subject to any disclaimer, the term of this patent is extended or adjusted under 35 U.S.C. 154(b) by 410 days.

(21) Appl. No.: 11/269,841

(22) Filed: Nov. 9, 2005

(65) Prior Publication Data

US 2006/0098970 A1     May 11, 2006

(30) Foreign Application Priority Data

Nov. 10, 2004   (JP)   ............................. P2004-326427

(51) Int. Cl.
   *G03B 3/10*   (2006.01)
   *G06K 9/40*   (2006.01)
(52) U.S. Cl. ...................... 396/121; 382/255
(58) Field of Classification Search ................ 348/234, 348/345, 346; 382/255; 396/121
   See application file for complete search history.

(56) References Cited

U.S. PATENT DOCUMENTS

| 3,896,304 | A | * | 7/1975 | Aoki et al. ............... 250/201.7 |
| 6,023,056 | A | * | 2/2000 | Fiete et al. ............... 250/201.7 |
| 6,057,935 | A | * | 5/2000 | Freeman ...................... 358/1.9 |
| 6,373,992 | B1 | * | 4/2002 | Nagao ......................... 382/266 |
| 6,409,598 | B1 | | 6/2002 | Takeuchi |
| 2002/0148947 | A1 | * | 10/2002 | Kakiuchi et al. ......... 250/208.1 |
| 2003/0052988 | A1 | | 3/2003 | Kurosawa |
| 2004/0051789 | A1 | | 3/2004 | Horita |
| 2004/0051794 | A1 | | 3/2004 | Horita |
| 2004/0160519 | A1 | | 8/2004 | Horita |
| 2004/0212738 | A1 | * | 10/2004 | Sheraizin et al. ............ 348/586 |
| 2006/0078217 | A1 | * | 4/2006 | Poon et al. .................. 382/255 |

* cited by examiner

*Primary Examiner*—W. B. Perkey
*Assistant Examiner*—Minh Phan
(74) *Attorney, Agent, or Firm*—Greenblum & Bernstein, P.L.C.

(57) ABSTRACT

An image signal processing unit which processes image signals corresponding to an image divided into a plurality of image-areas is provided. The image signal processing unit comprises a first detector, a second detector, and a blurring processor. The first detector detects a sharpness. The sharpness corresponds to how much of the image-area is in focus based on the image signals. The second detector detects an out-of-focus area from the image-areas when the sharpness of an out-of-focus area is out of a predetermined permissible range. The blurring processor carries out a blurring process for the out-of-focus area signal corresponding to the out-of-focus area.

6 Claims, 9 Drawing Sheets

$30_{nh}$

FILTER TO CALCULATE LUMINANCE VARIATION

$30_{nL}$

FILTER TO SMOOTH
LUMINANCE VARIATION

FIG. 7

| 16 | 16 | 13 | 11 | 7 | 4 | 1 | 0 | 0 |
|---|---|---|---|---|---|---|---|---|
| 16 | 14 | 12 | 9 | 6 | 3 | 1 | 0 | 0 |
| 13 | 12 | 10 | 8 | 5 | 2 | 1 | 0 | 0 |
| 11 | 9 | 8 | 6 | 4 | 2 | 1 | 0 | 0 |
| 7 | 6 | 5 | 4 | 3 | 2 | 2 | 2 | 2 |
| 4 | 3 | 2 | 2 | 2 | 2 | 2 | 2 | 3 |
| 1 | 1 | 1 | 1 | 2 | 2 | 2 | 2 | 3 |
| 0 | 0 | 0 | 0 | 2 | 2 | 2 | 3 | 3 |
| 0 | 0 | 0 | 0 | 2 | 3 | 3 | 2 | 4 |

30

$30_{(7,7)}$

| 0 | 0 | 0 | 0 | 1 | 1 | 1 | 1 | 1 |
|---|---|---|---|---|---|---|---|---|
| 0 | 0 | 0 | 0 | 1 | 1 | 1 | 1 | 1 |
| 0 | 0 | 0 | 1 | 1 | 1 | 1 | 1 | 1 |
| 0 | 0 | 1 | 1 | 1 | 1 | 1 | 1 | 1 |
| 1 | 1 | 1 | 1 | 1 | 1 | 1 | 1 | 1 |
| 1 | 1 | 1 | 1 | 1 | 1 | 1 | 1 | 1 |
| 1 | 1 | 1 | 1 | 1 | 1 | 1 | 1 | 1 |
| 1 | 1 | 1 | 1 | 1 | 1 | 1 | 1 | 1 |
| 1 | 1 | 1 | 1 | 1 | 1 | 1 | 1 | 1 |

--30

IMAGE FOR MASKING

IMAGE SIGNAL PROCESSING UNIT AND DIGITAL CAMERA

BACKGROUND OF THE INVENTION

1. Field of the Invention

The present invention relates to an image signal processing unit which carries out a blurring process for image signals and relates to a camera having an image signal processing unit.

2. Description of the Related Art

Photographing in a shallow depth of field is well known. The photographing in a shallow depth of field is carried out to intentionally blur the foreground and background of a main object being photographed. Such a blurring process is achieved by intentionally placing the background area of the photograph out of the depth of field under the condition that the main object is in focus. The degree of blurring depends on the distance between an imaging surface and a camera lens, and on the size of the imaging surface. The blurring of the background is in proportion to the distance between the imaging surface and the camera lens, and the size of the imaging surface. Consequently, it is necessary for strong blurring, that the distance and the size are maximized as much as practical. Recently, compact type digital cameras, that are smaller than film cameras and single lens reflex digital cameras, have become available. As for the compact type digital cameras, the distance between an imaging surface and a camera lens is narrow, and the size of the imaging surface is small. Accordingly, it is difficult to take a photograph in a shallow depth of field with these compact type digital cameras.

SUMMARY OF THE INVENTION

Therefore, an object of the present invention is to provide an image signal processing unit that generates an image signal corresponding to an image in a shallow depth of field.

According to the present invention, an image signal processing unit which processes image signals corresponding to an image divided into a plurality of image-areas, is provided. The image signal processing unit comprises a first detector, a second detector, and a blurring processor. The first detector detects a sharpness corresponding to how much of the image-area is in focus, based on the image signals. The second detector detects an out-of-focus area for the image-area, that is to say the second detector detects when the sharpness is out of a predetermined permissible range. The blurring processor carries out a blurring process for an out-of-focus area signal corresponding to the out-of-focus area.

Further, the first detector detects a luminance variation of a selected image-area. A luminance variation is a difference between a luminance at the selected image-area and a luminance at another image-area that is neighboring the selected image-area. The second detector detects the out-of-focus area for the image-areas when the luminance variation is under a first threshold value. The first threshold value is predetermined for judging whether to carry out the blurring process or not.

Further, the first detector smoothes a first luminance variation according to a neighboring luminance variation. The first luminance variation is one of a first image-area. The neighboring luminance variation is one of another image-area neighboring the first image-area. The first detector replaces a first luminance variation with a smoothed luminance variation.

BRIEF DESCRIPTION OF THE DRAWINGS

The objects and advantages of the present invention will be better understood from the following description, with reference to the accompanying drawings in which:

FIG. 7 illustrates smoothed luminance variations for the same image and pixel area as shown FIG. 5;

DESCRIPTION OF THE PREFERRED EMBODIMENTS

Figure 1:
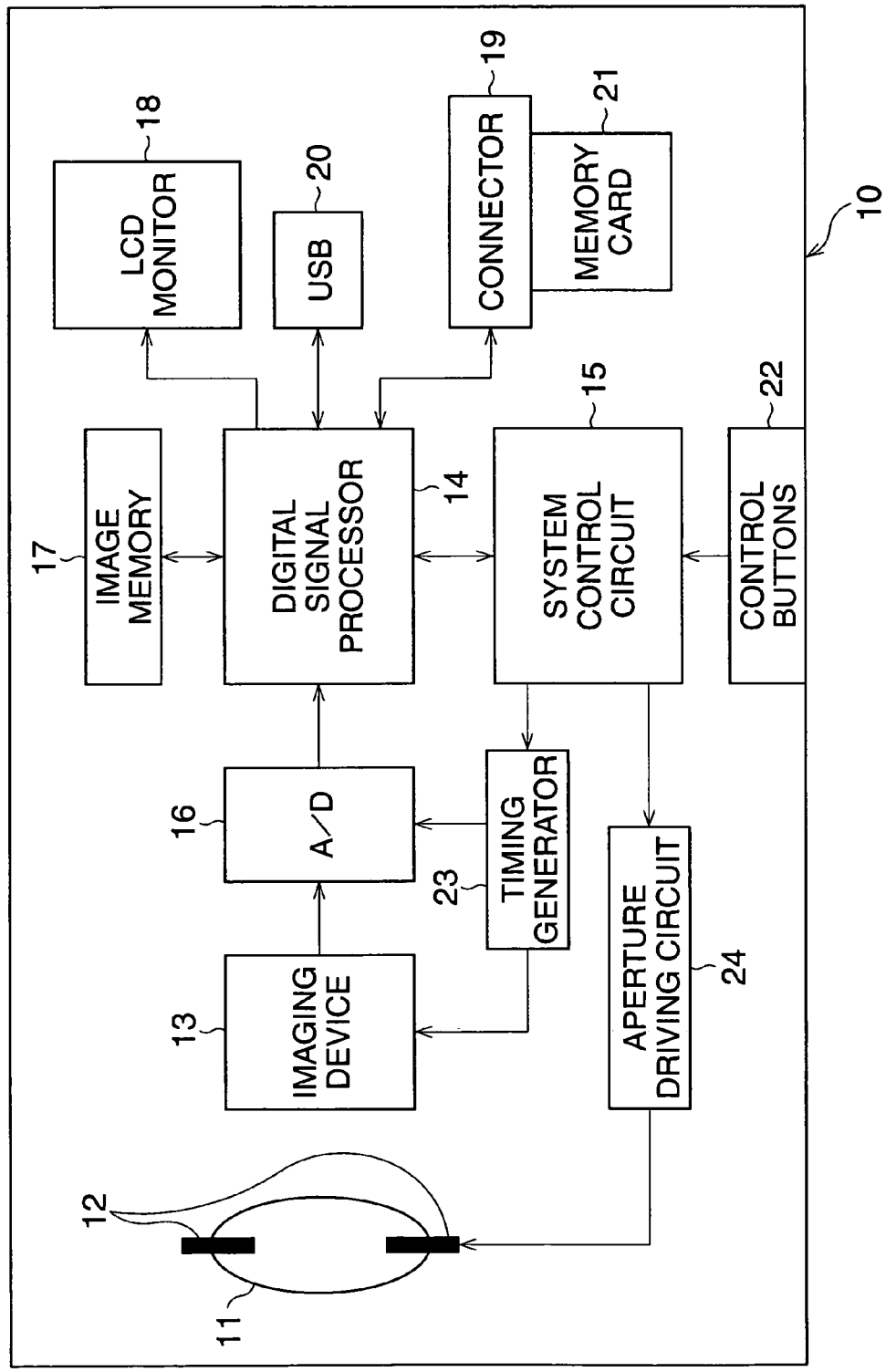
FIG. 1 is a block diagram showing the internal structure of a digital camera having an image signal processor of an embodiment of the present invention.

The present invention is described below with reference to the embodiment shown in the drawings.

A digital camera 10 comprises a photographic optical system 11, an aperture 12, an imaging device 13, a digital signal processor 14, and a system control circuit 15. The photographic optical system 11 has a plurality of lenses. The aperture 12 is fixed between the lenses forming the photographing optical system 11. The aperture 12 also works as a shutter.

The imaging device 13 is optically connected with the photographic optical system 11. The imaging device 13 is for example a CCD. The imaging device 13 receives an optical image including an image of a main object through the photographic optical system 11. The imaging device 13 generates image signals corresponding to the received image. A plurality of pixels is arranged in a matrix at an imaging surface of the imaging device 13. Each pixel generates a pixel signal according to an amount of light received at each pixel. Pixel signals, generated by a plurality of pixels, on the receiving surface form the image signal.

The imaging device 13 is electrically connected with the digital signal processor 14 through an A/D converter 16. The image signal, that is analogue, is converted to a digital signal by the A/D converter 16. The image signal is sent to the digital signal processor 14 after A/D conversion.

The digital signal processor 14 is electrically connected with an image memory 17, an LCD monitor 18, a connector 19 connecting to a memory card 21, and a USB 20. The image memory 17 is for example a DRAM. The image signal input to the digital signal processor 14 is stored in the image memory 17 for signal processing. The digital signal processor 14 carries out some predetermined signal processes, for example a color interpolation process, a white balance process, and so on, for the image signals stored in the image memory 17. In addition, the digital signal processor 14 carries out an out-of-focus pixel detecting process and a partial-blurring process, explained in detail later, for the image signals if necessary.

The image signals, having undergone the signal processes at the digital signal processor 14, are sent to the LCD monitor 18. The image corresponding to the image signals, is displayed on the LCD monitor 18. Besides, carrying out the signal processes for the image signals, the digital signal processor 14 can send the image signals through the connector 19 to the memory card 21 where they can be stored. The memory card 21 can be connected to and disconnected from the connector 19 as required. Further besides, carrying out the signal processes and storage operation for the image signals, the digital signal processor 14 can also output the image signals to a personal computer or a printer that is connected with the digital camera 10, at USB 20.

The digital signal processor 14 is connected to the system control circuit 15. The system control circuit 15 controls the movement of the digital camera 10, including the signal processes carried out by the digital signal processor 14.

The system control circuit 15 is electrically connected to a power button (not depicted) and control buttons 22. The digital camera 10 is changed from an on state to an off state or from an off state to an on state by pushing the power button. Some functions of the digital camera 10 are performed by pushing the control buttons 22. A normal mode, a portrait mode, and other modes are set up for the digital camera 10. In the normal mode, a usual image is displayed and image signals corresponding to a usual image are stored in the memory card 21. In the portrait mode, an image in a shallow depth of field, where the foreground and background of the main object are blurred, is displayed and image signals corresponding to the partially blurred image are stored in the memory card 21. A mode of the digital camera 10 is changed by pushing a mode change button of the control buttons 22.

Besides, being electrically connected to a release button (not depicted), the system control circuit 15 is also connected to a timing generator 23, and an aperture driving circuit 24. The system control circuit 15 carries out the entire imaging operation by controlling the timing generator 23 and the aperture driving circuit 24, when the release button is pushed. The timing generator 23 is electrically connected to the imaging device 13 and the A/D converter 16. The timing generator 23 drives the imaging device 13 and the A/D converter 16. The aperture driving circuit 24 drives the aperture 12, and then an adjustment of an aperture ratio and an open/close operation of the shutter are carried out.

Next, the out-of-focus pixel detecting process and the partial-blurring process, carried out when the portrait mode is selected, are explained.

The image memory 17 can store image signals sent from the imaging device 13, as described above. Further, the image memory 17 can receive image signals from the memory card 21 and store them. Further still, the image memory 17 can receive image signals from other external apparatus through the USB 20 and store them. The digital signal processor 14 can carry out the out-of-focus pixel detecting process and the partial-blurring process for the image signals stored in the image memory 17.

The out-of-focus pixel detecting process is carried out in two steps. The first step is to detect the sharpness to which a part of an optical image received by a pixel is in focus, according to an arranged distance between the photographic optical system 11 and an imaging surface. The second step is to distinguish whether the sharpness of a pixel is out of a predetermined permissible range so as to be considered an out-of-focus pixel.

In this embodiment, a luminance variation for each pixel is detected as a sharpness. The luminance variation is a variation between luminance at a selected pixel and luminance at pixels neighboring or surrounding the selected pixel.

Figure 2:
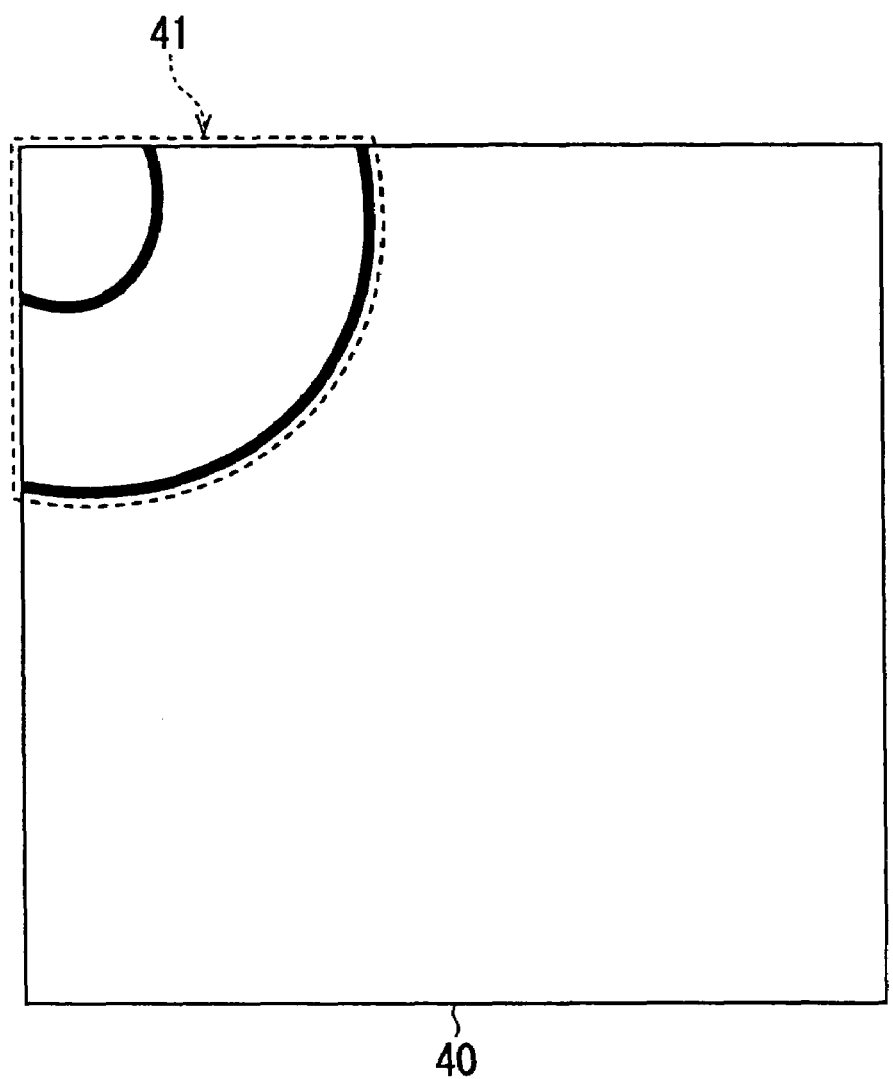
FIG. 2 is an image diagram showing a main object that is in focus and a background that is out of a permissible depth of field.
Figure 3:
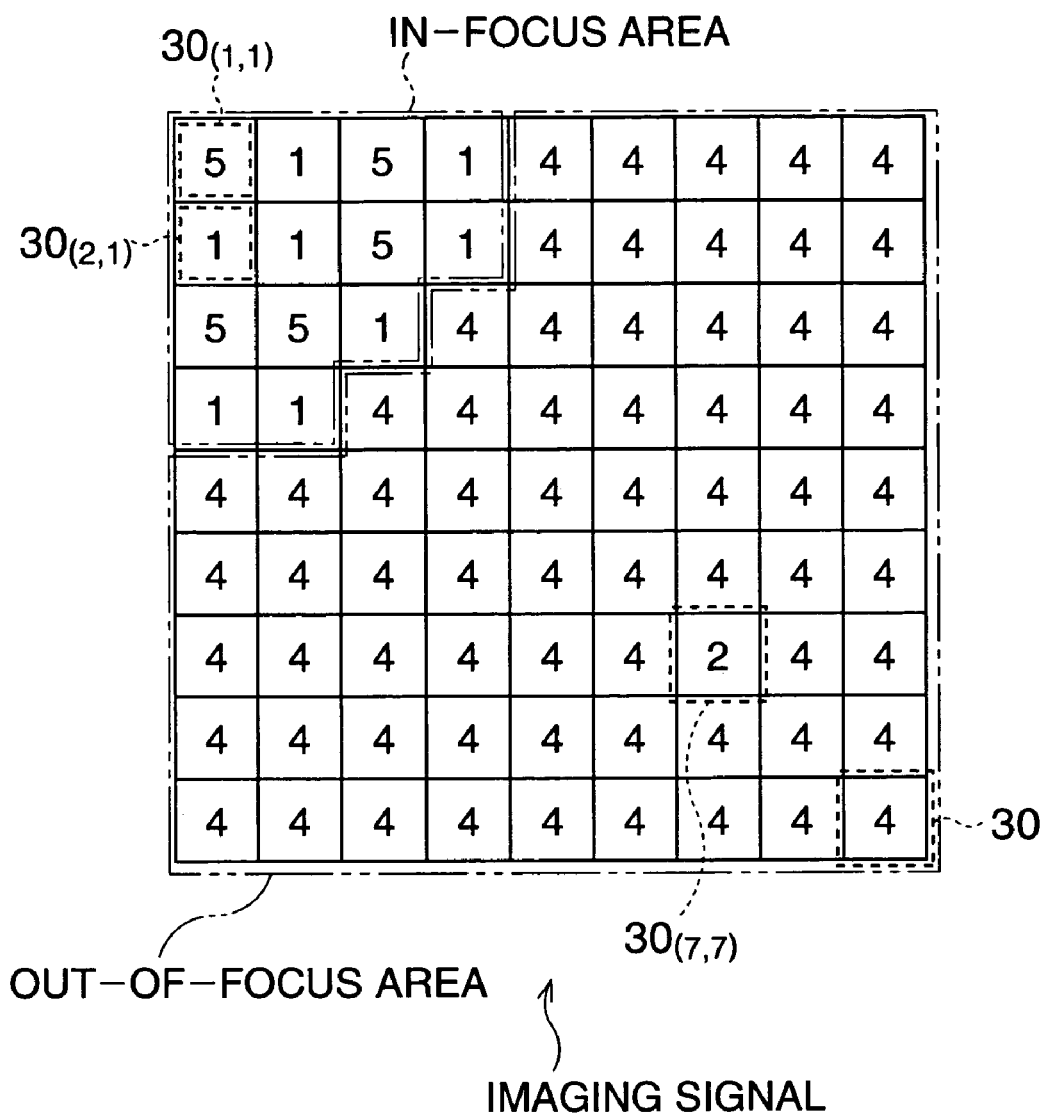
FIG. 3 is a conceptual diagram of an image signal corresponding to the image of FIG. 2.

A relation between a luminance variation and a sharpness is explained with reference to FIGS. 2, and 3. FIG. 2 is an image 40 showing a main object 41 that is in focus and other objects that are out of a permissible depth of field. FIG. 3 is a conceptual diagram of an image signal corresponding to the image 40 of FIG. 2. The image is formed by pixels 30 arranged in 9 rows and 9 columns. The image signal comprises a plurality of pixel signals corresponding to pixels 30. The number described in each pixel 30 is the signal strength of the respective pixel signal. In this explanation, the signal strength of a pixel signal is in the range from one to five. The signal strength of each pixel signal corresponds to the amount of received light, the luminance, of each pixel 30.

Reflected light from a point on the main object 41 is focused on a point or pixel of the imaging surface. On the other hand, reflected light from a point of another object, for example a background object that is out of focus, is radiated at the imaging surface. Consequently, luminances at pixels neighboring each other and receiving a sharp optical image of the main object 41 are quite different (see "IN-FOCUS AREA" in FIG. 3) because the light components are not mixed, and the luminance at pixels neighboring each other and receiving a blurred optical image of the other objects is nearly equal (see "OUT-OF-FOCUS AREA" in FIG. 3). Accordingly, a large luminance variation is equivalent to a high sharpness (i.e. a high in-focus condition).

Figure 4:
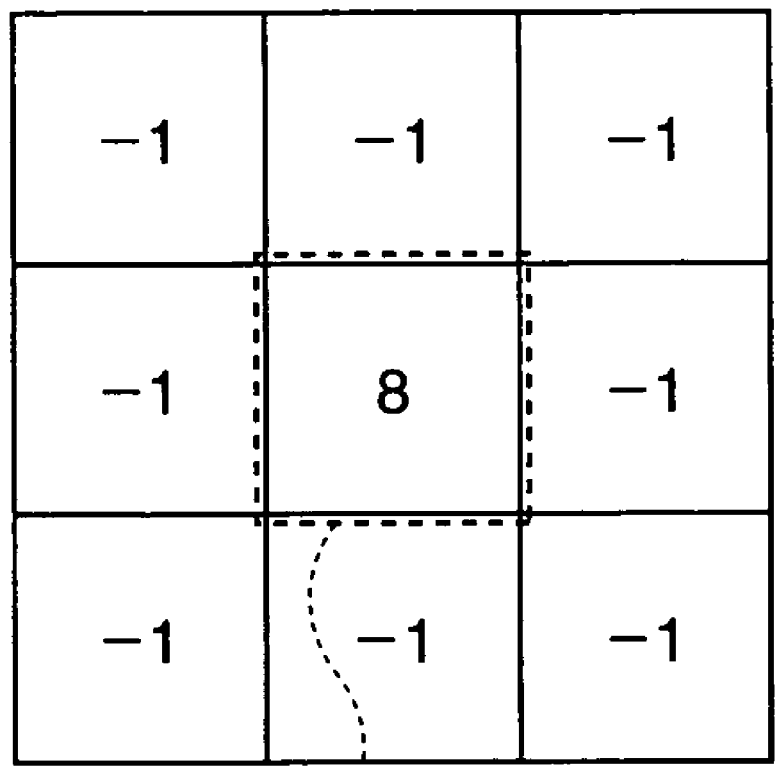
FIG. 4 is a conceptual diagram of a filter used for calculating luminance variations.

In this embodiment, a luminance variation at a selected pixel 30$nh$ (see FIG. 4) is calculated by using a digital filter as follows. First, a summed value of the selected pixel 30$nh$ is calculated by multiplying the luminance at the selected pixel 30$nh$ by 8, and subtracting the luminance at the 8 pixels neighboring the selected pixel 30$nh$. Next, the absolute value of the summed value is calculated. The absolute value is detected as a luminance variation at the selected pixel 30$nh$. A luminance variation for all pixels that form the image is detected.

When a pixel arranged in a corner, like the imaging pixel 30(1,1) in the first row and the first column, is selected, a summed value of the selected pixel 30$nh$ is calculated by multiplying the luminance at the selected pixel 30$nh$ by 3, and subtracting the luminance at the 3 pixels neighboring the selected pixel 30$nh$ instead of using the above first calculation. When a pixel arranged at a side, like the imaging pixel 30(2,1) in the first row and the second column, is selected, a summed value of the selected pixel 30$nh$ is calculated by multiplying the luminance at the selected pixel 30$nh$ by 5, and subtracting the luminance at the 5 pixels neighboring the selected pixel 30$nh$ instead of the above first calculation.

Figure 5:
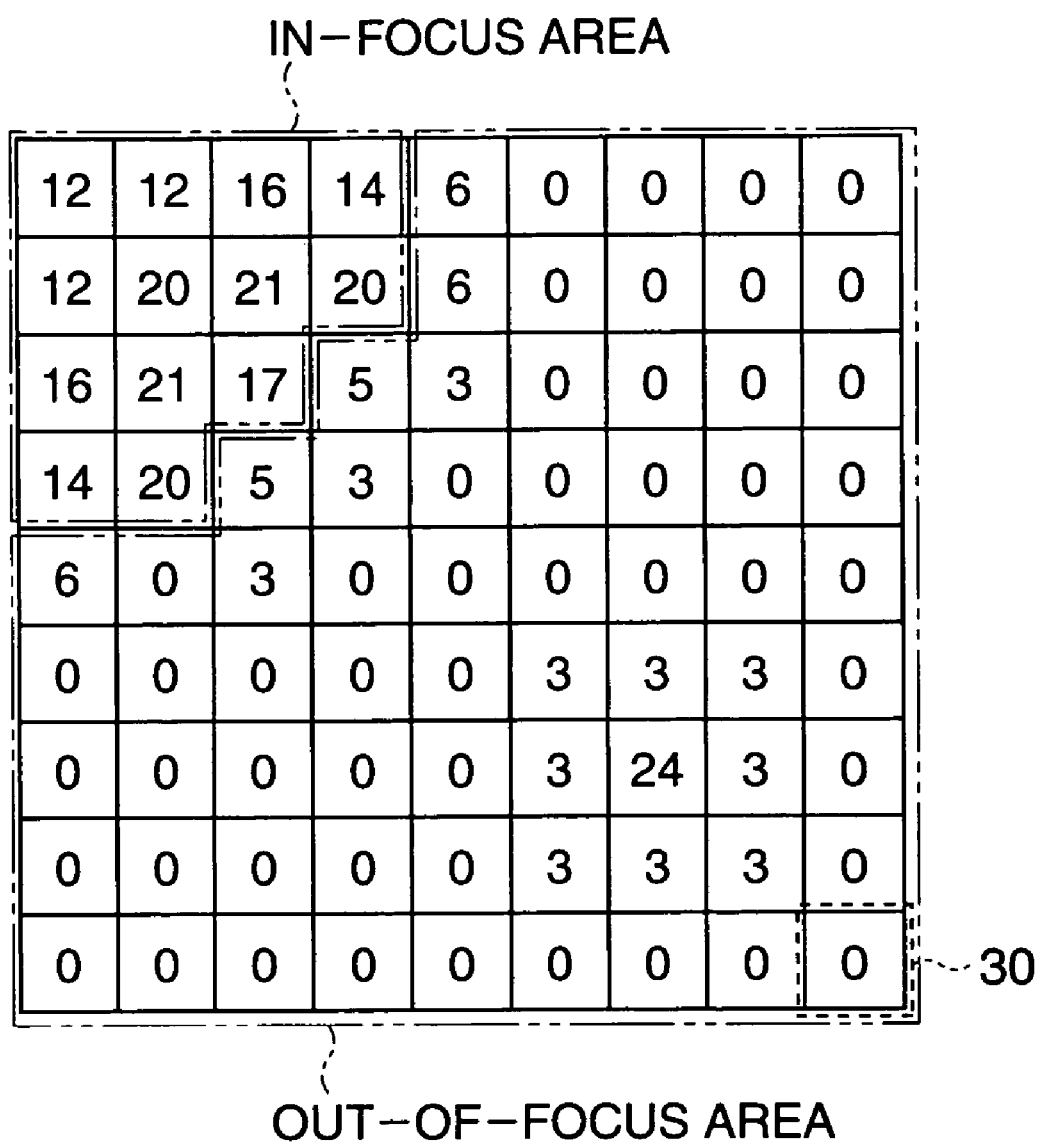
FIG. 5 illustrates luminance variations at pixels for the image of FIG. 2.

The luminance variation at each pixel 30 is calculated as shown in FIG. 5. As explained above, the luminance variations at the pixels 30 receiving an optical image of the main object 41 (see "IN-FOCUS AREA" in FIG. 5) is high, while the luminance variations at the pixels 30 receiving an optical image of the other objects (see "OUT-OF-FOCUS AREA" in FIG. 5) is low.

However, a pixel signal may not correspond to luminance due to noise on rare occasions, for example the pixel signal of the pixel 30(7,7) (see FIG. 3) is arranged in the seventh row and the seventh column. The signal strength of pixel signals including noise can be higher or lower than the signal strength of pixels whose luminance is the determining factor of signal strength. Accordingly, the luminance variation at the pixel 30 is high though the pixel 30 does not receive an optical image of the main object 41. Smoothing, as explained below, is carried out for luminance variations in order to accurately distinguish an out-of-focus pixel.

Figure 6:
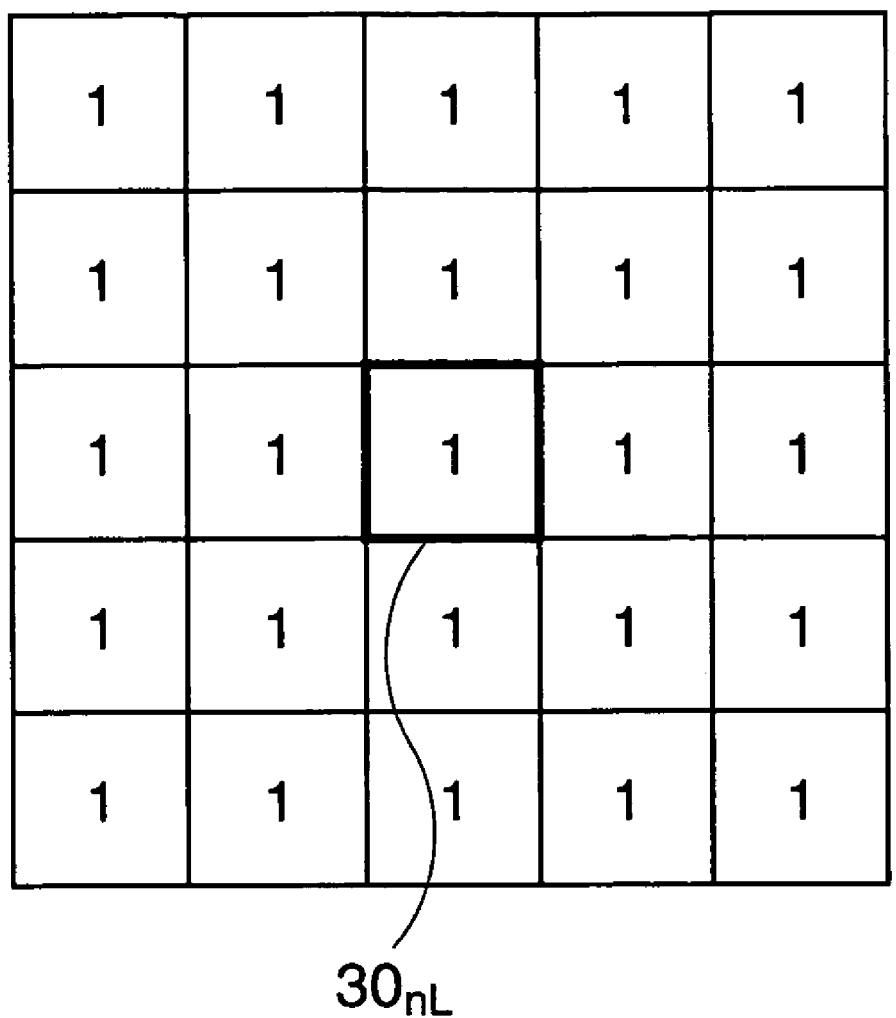
FIG. 6 is a conceptual diagram of a filter for smoothing luminance variations.
Figure 6:

A smoothing process is carried out for signals having luminance variations, and then a smoothed luminance variation is calculated by using a digital filter for smoothing process. As shown in FIG. 6, an average value of twenty five pixels in five rows and five columns is calculated as the smoothed luminance variation for the selected pixel 30nL that is located at the center of the rows and of the columns.

The smoothed luminance variation for each pixel 30 is calculated as shown in FIG. 7. The smoothed luminance variation for the pixel 30(7,7) is lowered owing to this smoothing. Consequently, the influence of noise is decreased.

After smoothing, the out-of-focus pixels are distinguished from all pixels 30 of the image. A first threshold value is predetermined for distinguishing the out-of-focus pixels and stored in a ROM (not depicted) connected to the digital signal processor 14. A pixel, having a smoothed luminance variation that is under the first threshold value, is distinguished as an out-of-focus pixel. The first threshold value is set to be a suitable value, for example nine in this embodiment, based on the actual smoothed luminance variations for the pixels 30 receiving an optical image of the main object and other objects.

Figure 8:
FIG. 8 illustrates an image for masking an area for the partial-blurring process, for the image signals of FIG. 3.

An image for masking is generated next based on the above distinguishing process. At first, a distinguishing signal is given to each pixel 30 based on the above distinguishing process. There are two kinds of distinguishing signals. One is the first distinguishing signal having a signal strength of one. The other is the second distinguishing signal having a signal strength of zero. The first distinguishing signal is assigned to the out-of-focus pixel. The second distinguishing signal is assigned to pixels 30 other than the out-of-focus pixels. After assigning the distinguishing signals to all the pixels 30, the masking signal corresponding to the image for masking, shown in FIG. 8, is generated. The masking signal is generated and stored in the image memory 17. The masking signal is generated separately from the image signal. After storing the masking signal, the out-of-focus pixel detecting process is completed.

In FIGS. 3, 5, 7, and 8, the pixels 30 showing luminance, luminance variation, smoothed luminance variation, and a distinguishing signal, accord with each other.

After the out-of-focus pixel detecting process, the partial-blurring process is carried out. The partial-blurring process is carried out on the image signals stored in the image memory 17 based on the masking signal. In the partial-blurring process, the blurring process is carried out for only pixel signals generated by the pixels 30, having the first distinguishing signal. Any kind of blurring process, such as the Gaussian filtering process, a smoothing process, and so on, is acceptable for the above partial-blurring process.

As described above, the image signals for which the partial-blurring process is carried out are output to the printer through the USB 20, or are sent to and stored in the memory card 21. Or the image signals are sent to the LCD monitor 18 and then an image, where objects other than the main object, such as background objects, are intentionally blurred, is displayed on the LCD monitor 18.

Figure 9:
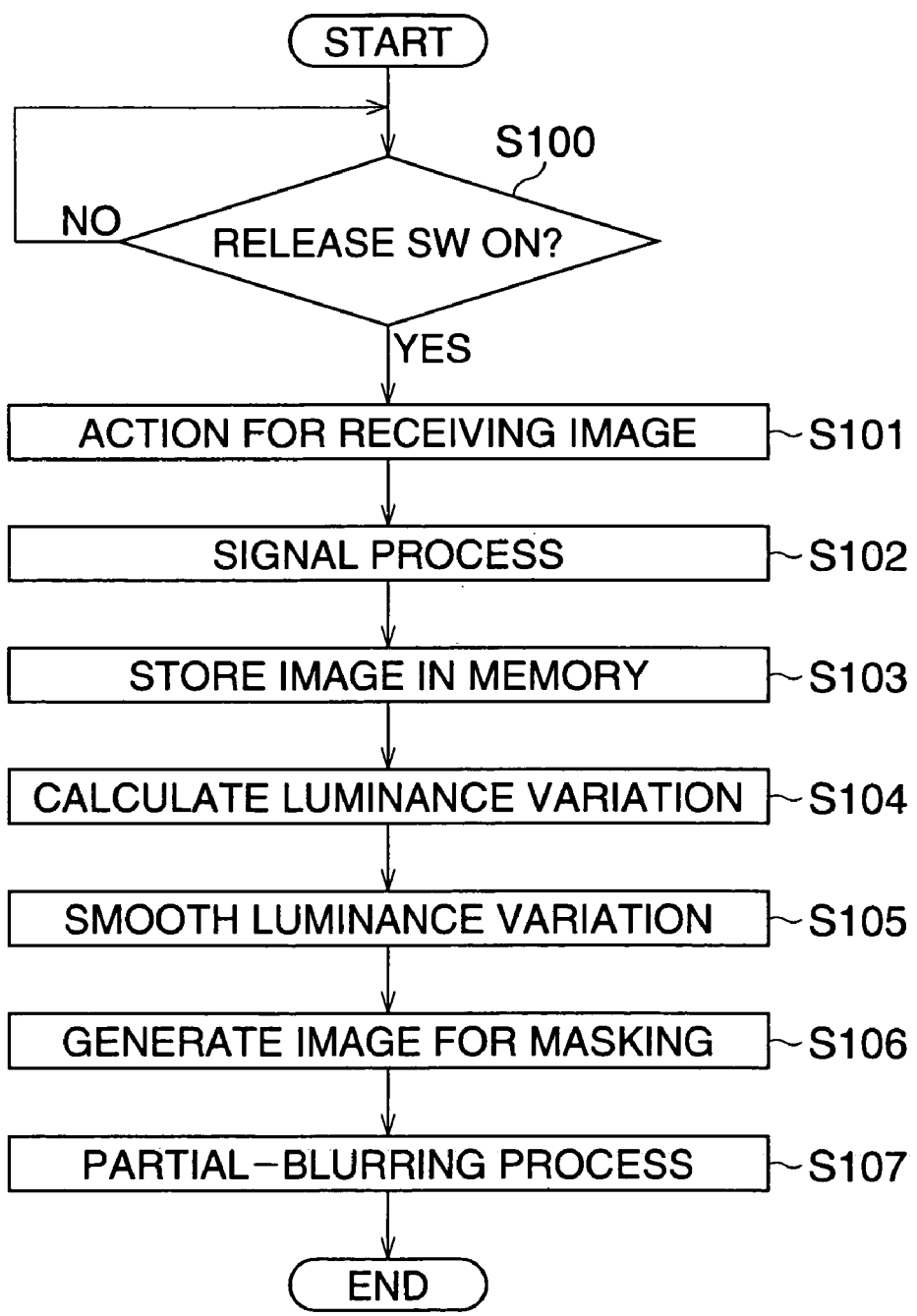
FIG. 9 is a flowchart to explain the out-of-focus pixel detection process and the partial-blurring process.

Next, the out-of-focus pixel detecting process and the partial-blurring process carried out by the image signal processor of this embodiment are explained using the flowchart of FIG. 9.

The processes start from step S100. At step S100, it is confirmed if the release button is pushed or not. The process returns to step S100 when the release button is not pushed. And step S100 is repeated until the release button is pushed.

The process goes to step S101 when the release button is pushed at step S100. At step S101, a necessary action for receiving an image is carried out, that is the aperture 12 is driven to open and close. The process then goes to step S102.

At step S102, an image signal generated by the imaging device 13 is converted from analogue to digital by driving the A/D converter 16. And then predetermined signal processes, such as a color interpolation process and a white balance process, are carried out on the image signals.

At step S103, the image signals, having been processed, are stored in the image memory 17, and then the process goes to step S104.

At step S104, a luminance variation for each pixel is detected based on the image signals. And the detected luminance variation is smoothed by carrying out a low pass filtering process at step S105.

At step S106, an image for masking is generated. A masking signal corresponding to the image for masking is generated and stored in the image memory 17. The masking signal is generated by giving one as a distinguishing signal to a pixel having a luminance variation that is under nine and giving zero as a distinguishing signal to a pixel having a luminance variation that is nine or over. The process goes to step S107 after the masking signals are generated.

At step S107, a partial-blurring process is carried out. The partial-blurring process is carried out on the image signals stored in the image memory 17 at step S103 based on the masking signals generated at step S106. The blurring process is carried out for pixel signals generated by the pixels that have the distinguishing signal one, as explained above. The image signals, having undergone the partial-blurring process, are stored in the image memory 17. The out-of-focus pixel detecting process and the partial-blurring process are completed at step S107.

In the above embodiment, it is possible to detect a pixel that receives an image of an object that is out of the depth of field, such as a background object under the condition that desired object is in focus, and to further blur the detected pixel.

A pixel, having a smoothed luminance variation that is under a first threshold value, is detected as an out-of-focus pixel in the above embodiment. However, it is possible to detect an out-of-focus pixel with a luminance variation without smoothing. The smoothing is carried out in order to decrease the influence of noise included in a pixel signal. The smoothing is unnecessary, especially if a luminance variation is detected based on pixel signals where noise is removed by other means. If smoothing is not carried out in the above embodiment, the first threshold value is set to a suitable value based on the actual luminance variations at the pixels receiving an optical image of the main object and the other objects.

A luminance variation is used for detecting an out-of-focus pixel in the above embodiment. However, a spatial frequency can be used. As mentioned above, reflected light from each point of the other objects that are out of focus, is radiated to the imaging surface. Consequently, the spatial frequency of an area receiving an optical image of the objects that are out of focus is low. On the other hand, a spatial frequency of an area receiving an optical image of the object that is in focus is high. Accordingly, it is possible to detect an out-of-focus pixel by detecting the spatial frequency of each pixel and distinguishing pixels, where the spatial frequency is under the predetermined threshold level. It is possible to detect an out-of-focus pixel by detecting another variable that changes according to spatial frequency. Further, it is possible to detect an out-of-focus pixel by detecting any variable that changes according to the sharpness.

For example, an autocorrelation coefficient of a pixel changes according to a sharpness. Pixel signals, generated by pixels receiving an optical image of the main object that is in focus, are not highly correlated with other pixel signals generated by neighboring pixels. On the other hand, pixel signals, generated by pixels receiving an optical image of other object that is out of focus, are highly correlated with pixel signals generated by neighboring pixels. Consequently, a sharpness is lowered as an autocorrelation coefficient is higher. Accordingly, it is possible to detect an out-of-focus pixel by calculating an autocorrelation coefficient of each pixel and detecting a pixel that has an autocorrelation coefficient that is over a predetermined threshold value. The work load of a digital signal processor for calculating an autocorrelation coefficient is higher than that of a digital signal processor for detecting a luminance variation such as that in the above embodiment. However, it is possible to more accurately detect an out-of-focus pixel by calculating an autocorrelation coefficient.

The out-of-focus pixel detecting process and the partial-blurring process is carried out on image signals generated by an imaging device in the above embodiment. However, these processes may be carried out on image signals generated by any other means; for example, image signals corresponding to an artificially generated computer image. As for image signals corresponding to a computer graphic, luminance at a minimum area of a whole image may be detected instead of luminance at a pixel of an imaging device.

Although the embodiments of the present invention have been described herein with reference to the accompanying drawings, obviously many modifications and changes may be made by those skilled in this art without departing from the scope of the invention.

The present disclosure relates to subject matter contained in Japanese Patent Application No. 2004-326427 (filed on Nov. 10, 2004), which is expressly incorporated herein, by reference, in its entirety.

The invention claimed is:

1. An image signal processing unit which processes image signals corresponding to an image divided into a plurality of image-areas, comprising:
   a first detector that detects a sharpness corresponding to how much of said image-area is in focus based on said image signals;
   a second detector that detects an out-of-focus area, when said sharpness is out of a predetermined permissible range, for said image-area;
   a blurring processor that carries out a blurring process for an out-of-focus area signal corresponding to said out-of-focus area,
   wherein said first detector detects a luminance variation of a selected image-area, by calculating a difference between a luminance at said selected image-area and a luminance at another image-area that is neighboring said selected image-area, and said second detector detects said out-of-focus area, when the luminance variation is under a predetermined first threshold value for judging whether to carry out said blurring process, for said image-areas, and
   wherein said first detector smoothes a first luminance variation of a first image-area with a neighboring luminance variation of another image-area that is neighboring said first image-area, and replaces said first luminance variation with the smoothed luminance variation.

2. An image signal processing unit which processes image signals corresponding to an image divided into a plurality of image-areas, comprising:
   a first detector that detects a sharpness corresponding to how much of said image-area is in focus based on said image signals;
   a second detector that detects an out-of-focus area, when said sharpness is out of a predetermined permissible range, for said image-area;
   a blurring processor that carries out a blurring process for an out-of-focus area signal corresponding to said out-of-focus area,
   wherein said first detector detects a spatial frequency of said image-area to determine said sharpness, and said second detector detects said out-of-focus area, by determining when the spatial frequency is under a predetermined threshold frequency, for judging whether to carry out said blurring process, for said image-areas,
   wherein said first detector smoothes a first spatial frequency of a first image-area with a neighboring spatial frequency of another image-area that is neighboring said first image-area, and replaces said first spatial frequency with said smoothed spatial frequency of said first image-area.

3. An image signal processing unit according to claim 2, wherein said blurring process is a Gaussian filtering process.

4. An image signal processing unit according to claim 2, wherein said blurring process is a smoothing process.

5. An image signal processing unit according to claim 1, wherein said blurring process is a Gaussian filtering process.

6. An image signal processing unit according to claim 1, wherein said blurring process is a smoothing process.

* * * * *